United States Patent [19]

Chevereau et al.

[11] Patent Number: 5,257,295
[45] Date of Patent: Oct. 26, 1993

[54] CORE BAFFLING DEVICE FOR NUCLEAR REACTORS

[75] Inventors: Gérard Chevereau, Le Raincy; Jean-Claude Bougis, Courbevoie; Christian Borrell, Carrieres s/Seine, all of France

[73] Assignee: Framatome, Courbevoie, France

[21] Appl. No.: 747,995

[22] Filed: Aug. 21, 1991

[30] Foreign Application Priority Data

Aug. 21, 1990 [FR] France ................. 90 10526

[51] Int. Cl.⁵ .................. G21C 11/00; G21C 15/10
[52] U.S. Cl. .......................... 376/302; 376/400
[58] Field of Search ................. 376/302–304, 376/390, 400, 288, 289, 377, 399, 389

[56] References Cited

U.S. PATENT DOCUMENTS

| | | | |
|---|---|---|---|
| 3,356,589 | 12/1967 | Grell et al. | 376/302 |
| 4,462,956 | 7/1984 | Bairon et al. | 376/400 |
| 4,560,531 | 12/1985 | Leroy | 376/302 |
| 4,675,152 | 6/1987 | Verdeau et al. | 376/400 |
| 4,701,299 | 10/1987 | Alibran et al. | 376/302 |
| 4,849,162 | 7/1989 | Garner et al. | 376/400 |
| 4,925,624 | 5/1990 | Chevereau et al. | 376/400 |

FOREIGN PATENT DOCUMENTS

| | | | |
|---|---|---|---|
| 0059130 | 9/1982 | European Pat. Off. | 376/302 |
| 2818886 | 4/1979 | Fed. Rep. of Germany | 376/302 |
| 1272360 | 11/1986 | U.S.S.R. | 376/289 |
| 1151356 | 5/1969 | United Kingdom | 376/303 |

*Primary Examiner*—Harvey E. Behrend
*Attorney, Agent, or Firm*—Pollock, Vande Sande & Priddy

[57] ABSTRACT

A partitioning device is provided which can be used in a pressurized water nuclear reactor. It occupies the space between the prismatic shaped core of the reactor, and a cylindrical casing and comprises vertical partitioning plates surrounding the core and reinforcement elements placed between the partitioning plates and the casing. It comprises panels distributed into horizontal rows in vertical columns, all the panels of the same row being identical and having vertical partitioning plates welded together and fast with criss-crossed horizontal and vertical reinforcements bearing on the casing and with vertical tubes. The stacked tubes of a same column form a post resting on a core support plate. Solid vertical keys connect the panels in the different columns together and to the casing.

11 Claims, 4 Drawing Sheets

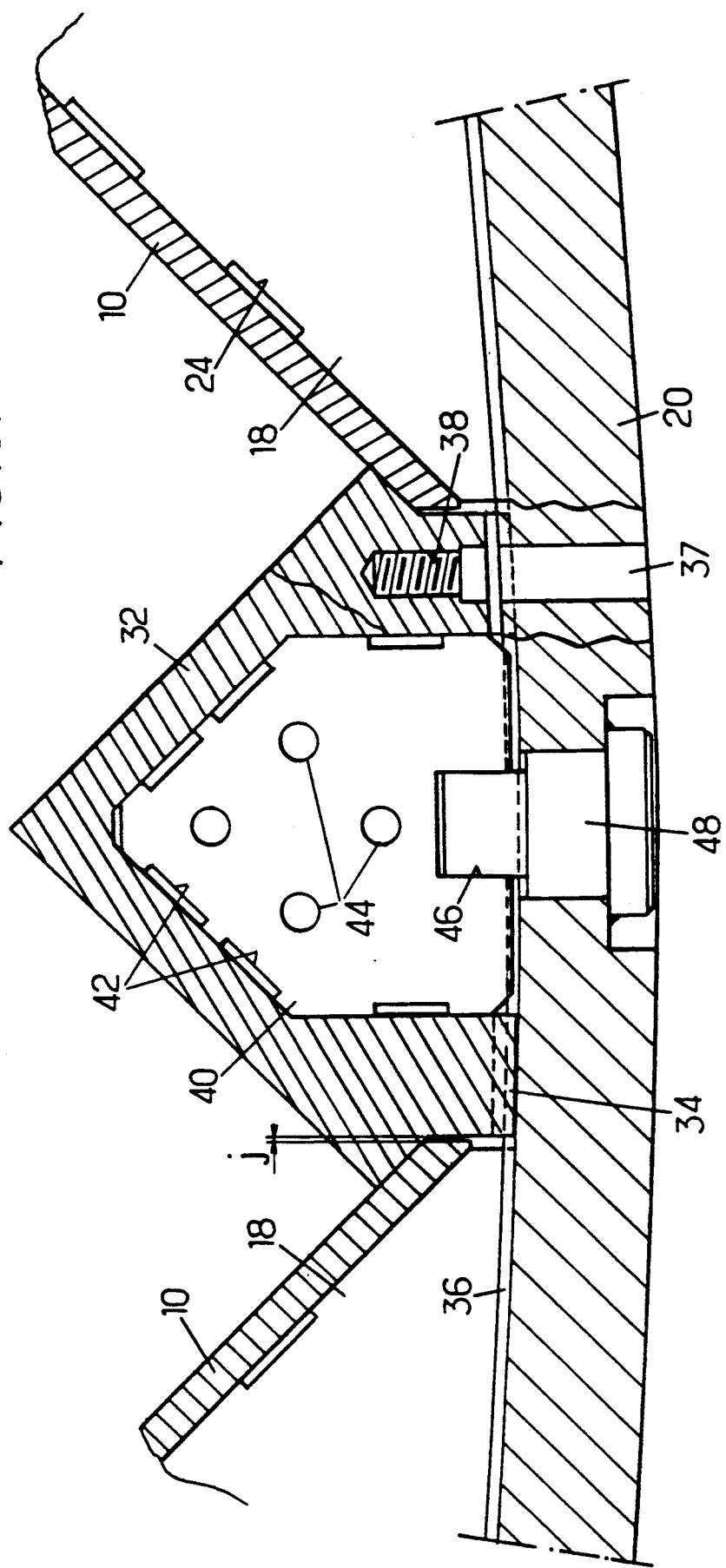

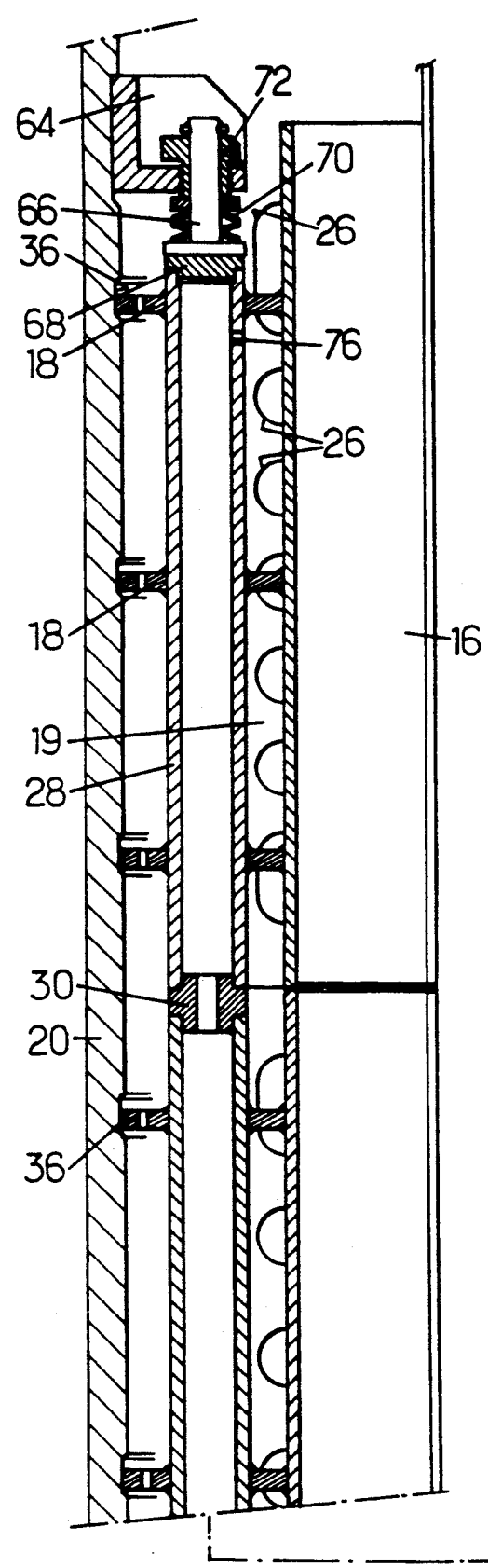
FIG. 6.
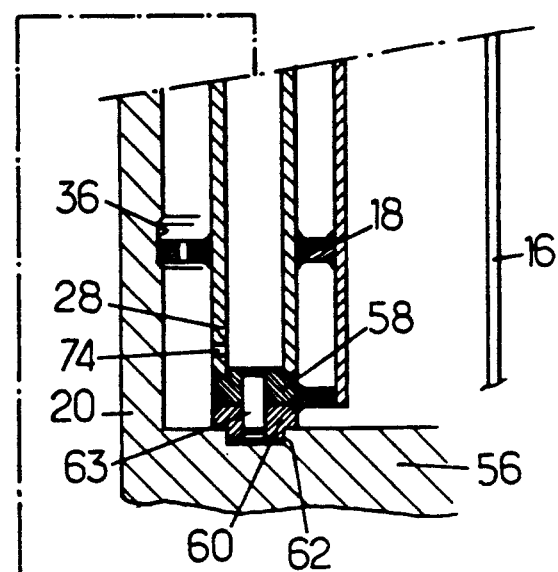
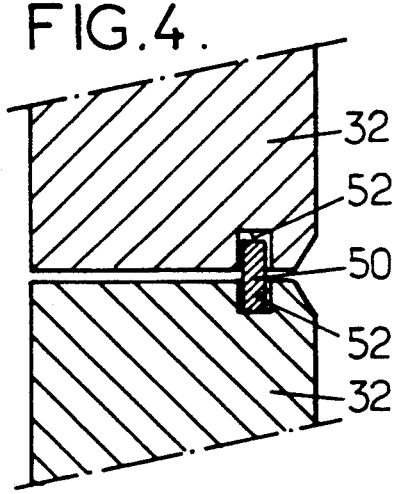
FIG. 4.
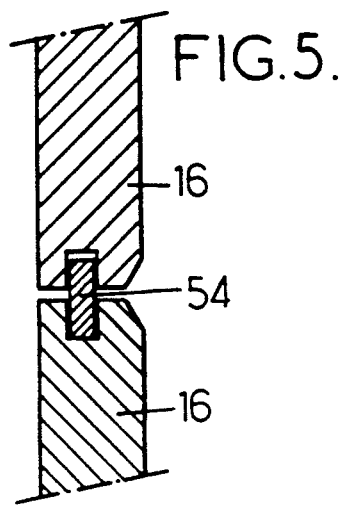
FIG. 5.

CORE BAFFLING DEVICE FOR NUCLEAR REACTORS

TECHNICAL FIELD

The present invention relates to a core baffling device for nuclear reactors, intended to occupy the annular space between the prismatic shaped core of the reactor and a cylindrical core casing and comprising vertical baffling plates surrounding the core and reinforcing elements placed between the baffling plates and the casing.

BACKGROUND OF THE INVENTION

Numerous baffling devices of the above type are already known. They force the coolant, which arrives under a core support plate through the annular gap which separates the casing from a pressure vessel, to flow through the fuel assemblies forming the core. In present day pressurized water reactors for example, the baffling device occupies the gap between the prismatic shape, with right angle facets, and the cylindrical casing.

In most baffling devices existing at the present time, the vertical baffling plates or "baffles" are held in position by horizontal plates, called formers. The mounting of such a baffling device, which must comply with strict dimensional requirements and withstand the temperature, radiation and differential pressure conditions prevailing in the vicinity of the core, raises problems which are only partially solved at the present time. In particular, the assembly of the plates and of the formers in the reactor, using screws whose number largely exceeds one thousand, is long and difficult. The breakage of a screw opens a gap, and so a leak jet harmful for the fuel rods of the assemblies placed in the vicinity.

SUMMARY OF THE INVENTION

An object of the present invention is to provide an improved baffling device. It is a more specific object to be carried out on the spot, inside the reactor vessel, and to increase reliability.

For this, there is provided a baffling device comprising panels distributed in horizontal rows and vertical columns, all panels of the same row being identical and having vertical baffling plates welded together, fast with horizontal and vertical mutually crossing reinforcements for bearing on the casing and with vertical tubes, the tubes of a same column forming, by stacking thereof, posts resting on a core support plate; and solid vertical keys connecting together the panels of the different columns and fixed to the casing.

In a nuclear reactor comprising square cross-section fuel assemblies, the panels will generally be distributed in three rows and four columns.

The invention will be better understood from the following description of a particular embodiment of the invention, given by way of non-limiting example. The description refers to the accompanying drawings.

BRIEF DESCRIPTION OF THE DRAWINGS

FIG. 3 is a horizontal cross-sectional view of a key, just above a key reinforcement (at left) part, at the horizontal level of a screw for connection to the casing (at right);

FIGS. 4 and 5 are cross-sectional views through a vertical plane passing through the axis of the core showing sealing strips between superimposed keys and between superimposed baffling plates, respectively;

FIG. 6 is a cross-sectional view along a vertical plane passing through the axis of the baffling device and of the core and through the axis of a post bearing on the core supporting plate.

DETAILED DESCRIPTION

The baffling device which will now be described by way of example can be used in a pressurized water nuclear reactor having a general construction of known type. It may for example replace a baffling device of the kind described in French Patent No. 2,484,125 (U.S. Pat. No. 4,560,531) to which reference may be made.

Figure 1:
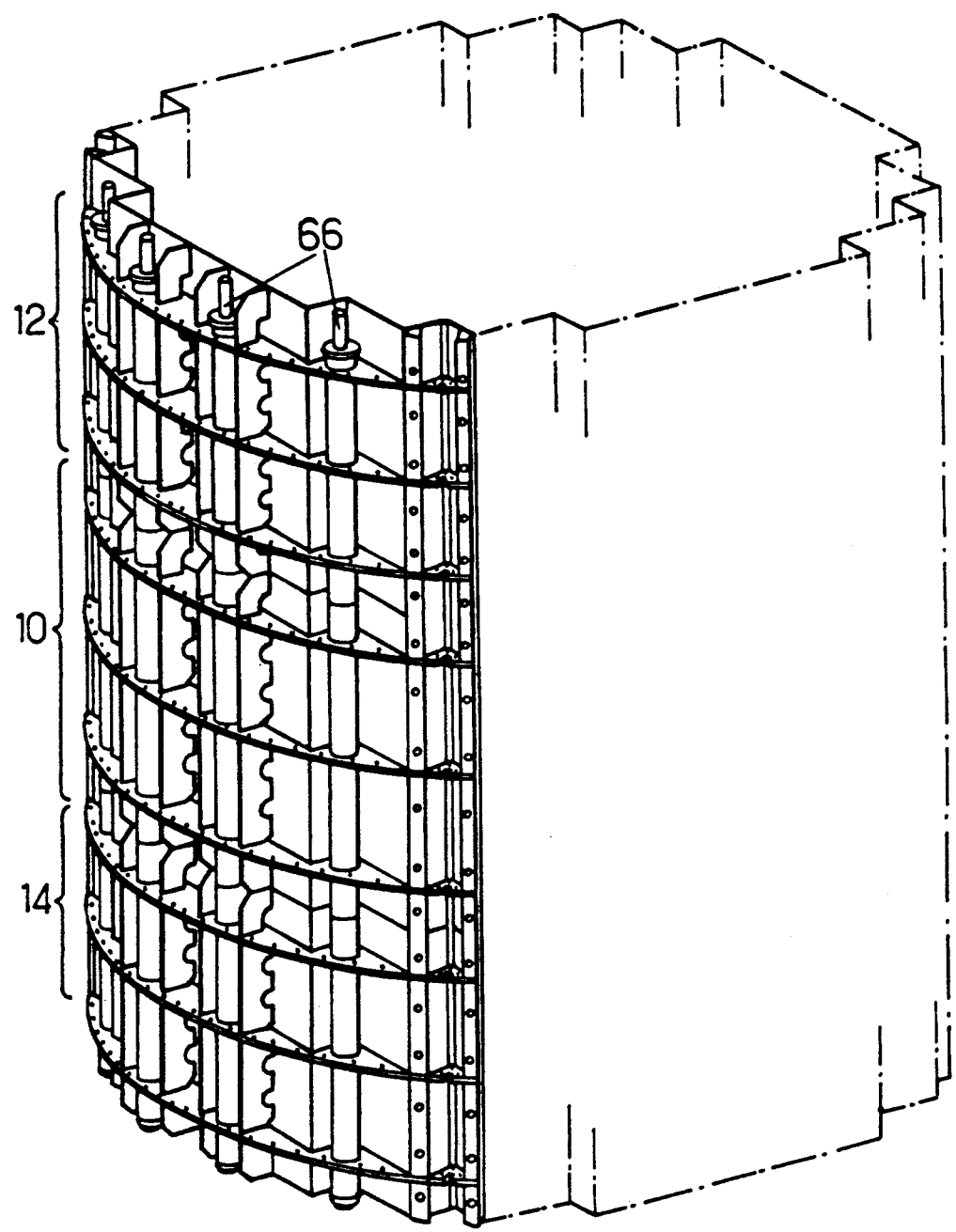
FIG. 1 is a perspective diagram showing the general form of a baffling device, the construction of the panels being shown over only an angular fraction of the device.
Figure 2:
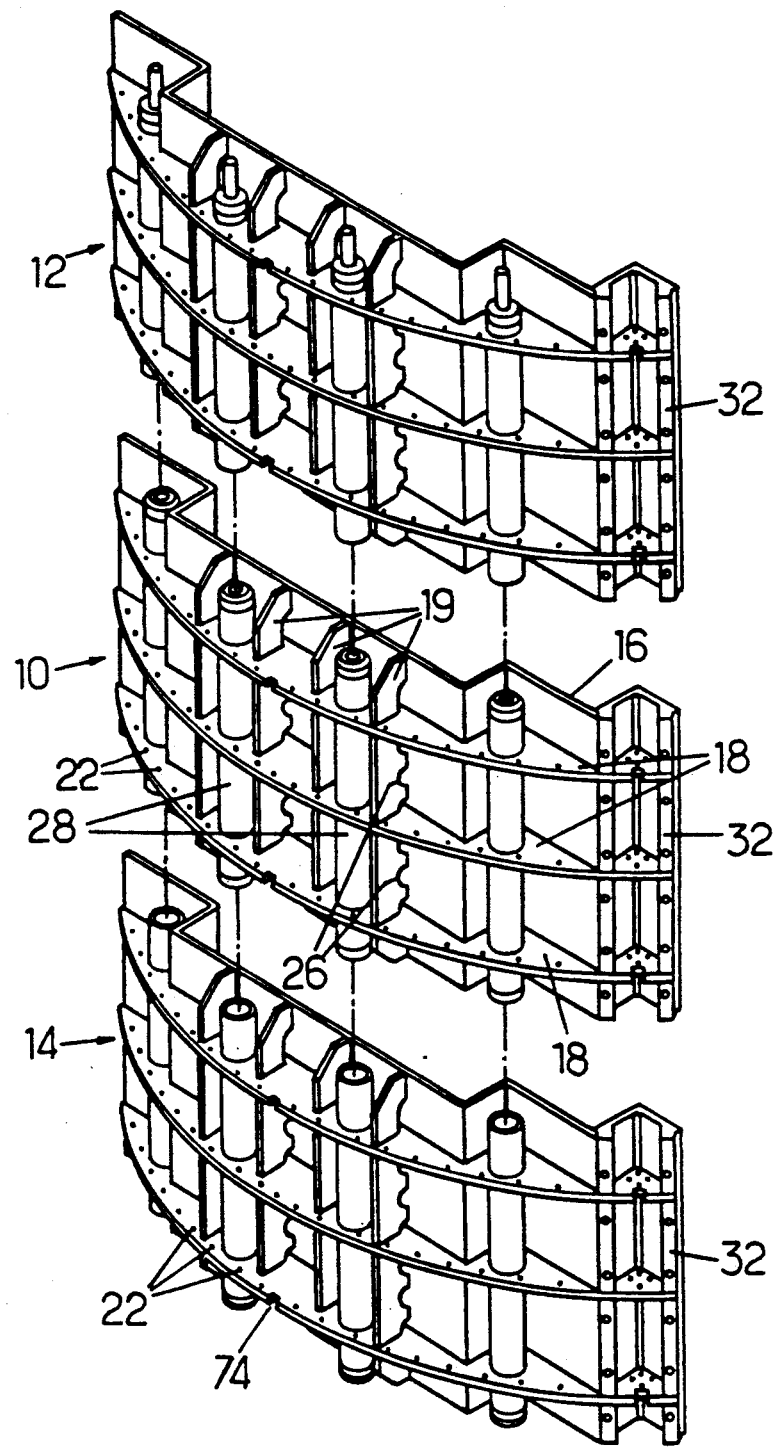
FIG. 2 is an exploded perspective view showing the three panels of a same coulumn and the keys placed on one side of the panels.

The baffling device shown in FIGS. 1 and 2 is split up into modules which can be produced in a factory, before assembling them in the reactor. These modules each form an azimuthal and vertical fraction of the baffling. In the embodiment shown by way of example, these modules comprise twelve panels, distributed in three horizontal rows and four vertical columns. Keys connect the panels of a same row together.

All panels have the same general construction. However, the panels 10 which form the middle row will typically have a height greater than that of panels 12 and 14 forming the upper and lower rows. In addition, the panels of the lower part, situated just above the core support plate, will generally have a different fastening system, as will be seen later.

The splitting up into twelve panels results from technical considerations bound in particular to the stresses related to twisting and to bending in the horizontal and vertical directions caused by shrinkage after welding of the stiffening reinforcements. A different number of panels might be preferable for a reactor whose core is formed of assemblies with hexagonal cross-section and/or is of great height.

Referring to FIG. 2, the construction of the middle panel 10 will now be described by way of example. The panel comprises an internal partition 16 formed of thin vertical plates, assembled together by welding, generally by electron beam welding, so as to reproduce the prismatic periphery of the core. The rigidity of the panel is provided by horizontal and vertical reinforcements 18 and 19 welded to the face of the partition opposite the core. The horizontal reinforcements 18, three in number in the embodiment shown in FIGS. 1 and 2, have an external edge in the form of part of a circle, of a diameter corresponding to that of the core casing 20 (FIGS. 3 and 6). These reinforcements are formed with holes 22 spaced apart circumferentially in the vicinity of the convex edge and With rectangular recesses 24 (FIG. 3) along the rectinear contour. The purpose of the holes and recesses is to allow a small upward flow of coolant which cools the baffling device and the internal surface of casing 20.

The vertical reinforcements 19, four in number in the embodiment illustrated, are split up into sections separated by the horizontal reinforcements 18. The vertical reinforcements occupy the whole height of partition 16. They are fixed by welding, like the horizontal reinforcements. Indentations 26 are formed in the edges of the vertical reinforcements bearing against the partition 16 to avoid the need of continuous welding, to reduce the effects of shrinkage, to allow a horizontal flow balancing the pressures in the cases defined by the reinforcements, the partition and the casing and to reduce heating due to gamma radiation.

The partitions and the vertical reinforcements of two superimposed panels do not bear mutually directly on each other. The elements of the panels which rest on each other consist of vertical tubes 28, thicker than the partitions and the reinforcements, which pass through the horizontal reinforcements 18 and are welded thereto. The tubes 28 of a same column are intended to rest on each other via centering and bearing sockets 30 (FIG. 6) so as to form supporting, indexing and retaining posts for the baffling device, as will be seen further on. The rigidifying effect of the tubes adds to that of the vertical reinforcements.

Solid joining keys 32 are disposed between the panels. Their number is equal to that of the panels. Each key 32 is formed as a structural section of the same length as the corresponding partition, in the form of an angle-iron, whose branches are machined so as to have sides against which bear the edges of the partitions belonging to two adjacent panels of a same row (FIG. 3). Bosses 34 projecting from the arms of each key are spaced apart vertically and arranged for engaging in circumferential grooves 36 of casing 20. The bosses are situated at the same levels as the horizontal reinforcements 18 of the panel. The keys are formed so as to be each fixed to casing 20 by two vertical rows of screws (not shown) passing through holes 37 in the casing and engaged in blind internally-threaded holes 38 formed in the key. A coolant circuit for cooling the screws is typically provided. It may comprise a recess formed in the key and along the axis of each screw and a clearance between the internal face of the key and the core casing.

Reinforcement gussets 40 situated at the same level as the horizontal reinforcements 18 of the panels are welded inside keys 32. In the edges of these gussets recesses 42 are formed, rectangular for example, for limiting the length of the welded zones and also for allowing a coolant flow along the keys. As shown, the gussets 40 are also formed with coolant circulation holes 44.

A rectangular indentation formed in some of the gussets or in each gusset 40, facing casing 20, is arranged for receiving a cylindrical indexing pin 48 passing through casing 20.

Continuity of the baffling device in the circumferential direction is obtained by abutment of the lateral portions of partitions 10 against the keys, a clearance J being provided for differential expansion (FIG. 3). Continuity in the vertical direction, necessary to avoid the passage of a leak flow between the core and the baffling device, is provided by sealing means allowing differential expansion and which are advantageously constructed as shown in FIGS. 4 and 5. The means placed between two superimposed keys 32 are formed by a thin strip 50, having an elongate rectangular cross-section, generally of stainless steel, interposed between the two keys and projecting into grooves 52 machined in the mutually confronting faces. Clearances may be provided in the radial direction to accomodate manufacturing tolerances and in the longitudinal direction to permit differential expansion. As shown in FIG. 5, continuity between the superimposed plates of the partition 16 is provided in a similar way by strips 54.

The panels may be mutually held in position by locking the posts on casing 20 fast with the lower core plate 56. The arrangement shown in FIG. 6 may in particular be used. In this case, the bottom of each tube 28 belonging to a lower panel is closed by a plug 58 welded to a centering piece 60 which has a shoulder arranged to seat on the lower core plate 56 and a projection inserted in a centering housing 62 machined in plate 56. A pin 63 may be provided for reinforcing the connection between the plug and the centering piece, formed at the time of assembling so as to allow compatibility of the machined portions on the core casing 20, plate 56 and plugs 58.

Sockets 30 provide relative centering of the stacked tubes 28. Finally, the tubes forming a post are forced against the lower core plate 56 by locking means having a resiliency sufficient to compensate for differential expansion and for maintaining the posts under compression forces. The locking means shown in FIG. 6 comprise a chair 64 fixed to the core casing 20, for example by screws (not shown), and bearing against a shoulder of the casing. They also comprise a pushrod 66 bearing against an upper key 68 closing the post. A bearing plate for the spring receives the force of Belleville washers 70 compressed by a threaded sleeve 72 screwed into chair 64.

A coolant flow is caused inside the baffling to cool it and also to generate, between the core and the inside of the baffling, a pressure differential which forces the horizontal reinforcements 18 of the panels against the core casing. That involves imposing a high head loss to the coolant at the inlet of the baffling, in the lower part thereof.

As illustrated, the head loss is provided by giving a small cross-sectional flow area to the holes 22 formed in the lowest horizontal reinforcement of the lower panels 14.

The coolant then flows through the holes provided in all horizontal reinforcements, up to the top of the baffling.

To enable coolant to flow inside the posts, holes 74 and 76 are provided respectively in the bottom part and in the top part of these posts.

By way of example, it may be indicated that a pressurized water reactor baffling device may be formed of twelve panels, panels 12 and 14 having a height of about 1300 mm whereas panels 10 have a height of about 1480 mm. The vertical reinforcements may be thinner than the horizontal reinforcements. Since their action is completed by that of the tubes, they may have a thickness of 15 mm instead of 25 mm for example. Partitions 16 may have a thickness of only 15 mm, which limits heating by gamma radiation. The keys may be secured by a relatively small number of screws, for example forty for each vertical row of keys. In the embodiment shown in the figures, each panel comprises four tubes, but a higher or smaller number could be adopted.

It can be seen that the device according to the specific embodiment of the invention as disclosed ensures correct positioning of the different components. Pins 48 (FIG. 3) index the keys. Similar pins, engaging in recesses 74 of some of the horizontal reinforcements (FIG. 2) may be provided for similarly indexing the panels. The position of the panels above each other is guaranteed by the presence of the centering pins 30 (FIG. 6).

The device of the invention has numerous advantages as compared to those known before. Assembling is simplier than that of devices using vertical bolts screwed onto formers, whence a considerable saving of time, the number of screws being about one tenth of that used before. The baffling plates may be devoid of pressure equalization holes, for the presence of the vertical and horizontal reinforcements makes the device sufficiently rigid for it to withstand an overpressure. Reliability is increased, for possible cracking of a welding reinforcement does not endanger a baffling panel. Geometrical correction of the baffling may be obtained by machining the bearing faces, after welding.

We claim:

1. In a nuclear reactor having a prismatic shaped core, a cylindrical casing and a core support plate, a core baffling device located in an annular space between the core and casing, said core baffling device comprising:
   a plurality of panels distributed so as to be distributed in an array having circumferential rows of said panels and vertical columns of said panels, all the panels of a same one of said circumferential rows being mutually identical and each of said panels comprising:
      a plurality of vertical baffling plates welded together and secured to mutually crossed horizontal reinforcements and vertical reinforcements bearing on the casing, and
      a plurality of vertical tubes projecting through and secured to said horizontal reinforcements of said panel, each said tube having substantially the same length as the respective panel, whereby the vertical tubes of those of said panels which belong to a same one of said columns are stacked and form posts resting on the core support plate;
   a plurality of solid vertical keys each fixed to said casing and each joining two mutually adjacent ones of said panels belonging to a same one of said rows and belonging to mutually adjacent columns for achieving circumferential continuity of said core baffling device; and
   means disposed between mutually adjacent edges of mutually adjacent panels belonging to a same one of said columns for achieving vertical continuity of said core baffling device.

2. In a nuclear reactor having a prismatic shaped core, a cylindrical casing and a core support plate, a core baffling device located in an annular space between the core and casing, said core baffling device comprising:
   a plurality of panels distributed so as to constitute an array having circumferential rows of said panel and vertical columns of said panels, all the panels of a same one of said rows being mutually identical and each of said panels having:
      a plurality of vertical baffling plates welded together and secured to mutually crossed horizontal reinforcements and vertical reinforcements bearing on the casing, and
      a plurality of vertical tubes each secured to said horizontal reinforcements of the respective panel, each having a length higher than and proportioned with respect to the size of the respective baffling plate so that a vertical clearance exists between the baffling plates of two superimposed panels in a same on of said columns and so that the vertical tubes of those of said panels which belong to a same one of said columns are stacked and form posts resign on the core support plate;
   a plurality of solid vertical keys each rigidly fixed to said casing and each having a length lower than porportioned to the length of the respective vertical tubes whereby a vertical clearance exists between two superimposed keys, each of said keys for slidably receiving edges of two mutually adjacent ones of said panels belonging to mutually adjacent columns;
   a plurality of sealing strips each disposed between two superimposed panels and projecting into two grooves in the respective superimposed baffling plates thereof; and
   a plurality of additional sealing strips each disposed between two superimposed keys and projecting into grooves formed in the respective keys.

3. In a nuclear reactor having a prismatic shaped core, a cylindrical casing and a core support plate, a core baffling device located in an annular space between the core and casing, said core baffling device having:
   (a) a plurality of panels distributed so as to constitute an array having circumferential rows of said panels and vertical columns of said panels, all the panels of a same one of said circumferential rows being mutually identical and each of said panels comprising:
      a partition formed of a plurality of vertical baffling plates welded together for the partition to have a shape reproducing the prismatic shape of the core.
      mutually crossed horizontal reinforcements and vertical reinforcements bearing on the casing and rigidly secured to a rear surface of said baffling plates,
      a plurality of vertical tubes secured to said horizontal reinforcements, said tubes being stacked to form posts resign on the core support plate;
   (b) a plurality of solid vertical keys each fixed to said casing and each joining two mutually adjacent ones of said panels belonging to a same one of said circumferential rows and belonging to mutually adjacent columns, for achieving circumferential continuity of said core baffling device, each said key having an angled cross-section and slidably receiving lateral portions of partitions of the two mutually adjacent panels separated by the key.
   the size of said vertical tubes being proportioned with respect to the size of the baffling plates and of the keys so that a vertical clearance exists between two superimposed baffling plates and between two superimposed keys when said vertical tubes are stacked;
   (c) a plurality if sealing strips each disposed between two superimposed panels and projecting into two grooves in the baffling plates of the respective superimposed panels; and
   (d) a plurality of additional sealing strips each disposed between two superimposed keys and projecting into grooves formed in the respective keys.

4. Device according to claim 1, wherein the panels are distributed into three rows and four columns.

5. Device according to claim 1, wherein said keys are formed by structural sections in the form of angle irons having means for receiving screws for connection to the casing.

6. Device according to claim 5, further comprising reinforcement gussets welded in the keys at the level of the horizontal reinforcements of the panels.

7. Device according to claim 5, wherein said keys are provided with bosses spaced vertically apart and provided for engaging into circumferential grooves of the casing, situated at the same level as the horizontal reinforcements of the panels 8. Device according to claim 5, wherein rectangular indentations are formed in some at least of said reinforcement gussets and wherein the casing carries cylindrical indexing pins projecting into the indentations.

9. Device according to claim 1, wherein the tubes of a same one of said same columns rest on each other via centering sockets to constitute said posts, each of said tubes of a lower one of said panels rests on the core support plate and locking means are located between each tube of each uppermost panel and the core casing so as to exert on the tube a force applying the respective post against the core support plate.

10. Device according to claim 8, wherein the locking means of each said post comprise structural means securely fixed to said casing and means located between said structural means and said post for exerting a force on the post via resilient means.

11. Device according to claim 1, wherein said vertical reinforcements and said horizontal reinforcements are formed with holes for circumferential and vertical flow of a reactor coolant.

* * * * *

UNITED STATES PATENT AND TRADEMARK OFFICE
CERTIFICATE OF CORRECTION

PATENT NO. : 5,257,295
DATED : October 26, 1993
INVENTOR(S) : Chevereau et al

It is certified that error appears in the above-identified patent and that said Letters Patent is hereby corrected as shown below:

In column 5, line 67, change "on" to --one--.

In column 6, lines 2 and 40, change "resign" to --resting--;

in line 6, correct spelling of --proportioned--.

Signed and Sealed this

Thirty-first Day of January, 1995

Attest:

BRUCE LEHMAN

Attesting Officer     Commissioner of Patents and Trademarks